United States Patent

[11] 3,577,629

| [72] | Inventors | George Wallis<br>Lexington;<br>John J. Dorsey, Waltham, Mass. |
|---|---|---|
| [21] | Appl. No. | 768,911 |
| [22] | Filed | Oct. 18, 1968 |
| [45] | Patented | May 4, 1971 |
| [73] | Assignee | P. R. Mallory & Co., Inc.<br>Indianapolis, Ind. |

[54] BONDING OXIDIZABLE METALS TO INSULATORS
12 Claims, No Drawings

| [52] | U.S. Cl. | 29/472.9 |
|---|---|---|
| [51] | Int. Cl. | B23k 31/02 |
| [50] | Field of Search | 29/472.9;<br>287/289.365; 204/16 |

[56] References Cited
UNITED STATES PATENTS

| 2,567,877 | 9/1951 | DeMent | 204/16 |
|---|---|---|---|
| 3,256,598 | 6/1966 | Kramer et al. | 156/272 |
| 3,397,278 | 8/1968 | Pomerantz | 29/472.9X |
| 3,417,459 | 12/1968 | Pomerantz et al. | 29/472.9 |

*Primary Examiner*—John F. Campbell
*Assistant Examiner*—Ronald J. Shore
*Attorneys*—Richard H. Childress, Robert F. Meyer and Henry W. Cummings ABSTRACT: An insulating member, such as a glass or fiber-optic, is bonded to a metallic member without excessive oxidation thereof by first heating the insulating member to a relatively low temperature and impressing a voltage across the members, causing an attraction between them which largely excludes atmospheric oxygen from the region to be bonded. The lowered resistivity of the insulator at this temperature also causes a low-density electric current to flow from one member to the other. The insulating member is then heated to a higher temperature while a voltage is maintained across the members, at which temperature a permanent bond is formed between the members in a relatively short time.

BONDING OXIDIZABLE METALS TO INSULATORS

In bonding a plurality of materials to each other, care must be taken substantially to match the thermal coefficients of expansion of the two materials, otherwise, stress or rupture of the bonded assembly will result as heating and cooling occurs. In particular, the formation of a bond between an insulator and a conductive material has been conventionally accomplished by direct fusion of the insulator (commonly a glass) to the conductive material (commonly a metal). Such a bond requires that the insulator be heated to a very high fusion temperature, normally 800°—1200° C. or higher, thus considerably aggravating the dimensional stability problem. Within the broader area of conductor to insulator seals, the bonding of optical glasses and fiber-optic materials to metals presents particular difficulties. For example, not only must the bond be prevented from rupturing due to thermally induced stresses, but the stresses must also be prevented from distorting the optical properties of the glass or fiber-optic material. That is, a great degree of dimensional stability is required in order to prevent warping and other distortions within the optical material. These ends may be attained by the use of lower bonding temperatures and by the use of a metal member having a thermal coefficient of expansion approximately equal to that of the particular glass to be bonded thereto.

Conventionally, optical glasses and fiber-optics are bonded to special metal alloys, commonly consisting mostly of iron and/or nickel, some of which also contain cobalt and traces of other metals, such as manganese. The bond is formed by placing a glass frit, usually made from a soft glass, in the joint area and then by heating the materials until the frit fuses and adheres to both the glass and the metal. This method, however, has several disadvantages. For example, the frit often is suspended in hydrocarbon binders and contains ingredients, e.g., lead, which introduce foreign materials into the bonding region and which often form bubbles and other discontinuities during formation of the bond. Additionally, the frit must be heated to its fusion temperature and the formation of a bond at the fusion temperature can result in inaccurate alignment of the materials.

Furthermore, some bonding processes employing heat must cope with the high oxidation rates of the alloys commonly used for sealing to glasses. An example of such an alloy is "Kovar," which contains approximately 54 percent iron, 29 percent nickel, 17 percent cobalt and 0.2 percent manganese. The oxidation rate, of course, increases rapidly with higher temperatures. It has been found in some cases that any admission of atmospheric oxygen into the bonding region at temperatures substantially greater than about 350° C. can form a thick and mechanically weak oxide coating so rapidly that bonding to the glass member is difficult. Thus, a readily oxidizable metallic material, as that term is used herein, denotes a metallic material, such as those containing appreciable amounts of iron, nickel, tantalum, titanium or various combinations of these metals, which forms a thick or mechanically weak oxide layer within a time period less than that required for completion of the bonding process herein described. Such an oxide layer would result in a weak bond or even in no bond at all, unless measures where taken to prevent or inhibit its formation upon the metallic surface to be bonded. Although oxidation may be precluded by performing the bonding operations in an inert or reducing atmosphere or a vacuum, production cost is substantially increased by the necessity for using vacuum, inert or reducing atmosphere equipment and by the time and handling difficulties involved.

In an advantageous method applicable to the bonding of inorganic insulators to metals, a metallic member may be bonded to an insulating member by placing substantially smooth and complementary surfaces of the members in juxtaposition and by heating the insulator to a temperature to cause it to become sufficiently electrically conductive. This temperature normally lies between about 150° C. and about 1200° C. for most insulators, depending upon, inter alia, the materials used. For examples of varying temperatures useful in the process of the present invention, a bond may be formed between a metallic foil and a hard glass, sold as Corning 07059, at a temperature of approximately 500° C., soft glass at approximately 300° C., and fused quartz at approximately 700° C. When the insulator has been heated to the requisite temperature, an electric potential is applied across the members to be bonded. The voltage impressed varies with the particular insulator and normally lies between about 100 volts and a few thousand volts, such as, 5,000 volts. The voltage must, of course, be kept below a value which would lead to sparking and dielectric breakdown of the insulator.

The potential across the members is maintained until a strong bond develops over the contacting surfaces thereof. Such a bond usually requires between about 10 seconds and about 20 minutes at the elevated temperature, depending upon, inter alia, such factors as the composition and size of the insulator material, the applied voltage and the current density. The bond is permanent and irreversible once formed.

Although the above-described process utilizes temperatures below those required for some bonding processes such as fusion bonding, the rapid oxidation of some metals even at these lower temperatures will result in the formation of a thick and mechanically weak oxide layer in the bonding region, thus degrading the strength and quality of the bond. More particularly, some metal alloys developed for sealing to glass, and especially those amenable for use with optical glass and fiber-optic composites, have very high oxidation rates above approximately 350° C. The alloy known as "Kovar" has previously been alluded to; "Niromet 44" and "Carpenter 49" are other such iron-based alloys. These metals are specifically compounded to match as closely as possible the thermal expansion properties of particular glasses and ceramic materials.

In overcoming the aforementioned and other problems, it is an object of the present invention to advance the bonding art by providing a method of effecting a bond between an insulating member and a readily oxidizable metallic member at a relatively low temperature and without excessive oxide formation in the bonding region.

It is another object of the invention to provide a process for effecting such a bond without the necessity of using an inert atmosphere or vacuum to prevent oxidation of the conductive member.

A further object is to provide a process for creating a strong and hermetic bond between such materials without introducing foreign materials into the bonding region.

STill a further object of the invention is to provide a process for forming a bond between a readily oxidizable metal member and a glass or fiber-optic member which preserves the dimensional stability of the bonded members.

Generally speaking, the above and related objects are achieved by first placing a substantially smooth surface of an insulating member in contact with a complemental surface of a readily oxidizable metallic member. The material of the insulating member is one which has a normally high electrical resistivity but which becomes electrically conductive at elevated temperatures. The metallic member will normally be an elemental metal or an alloy, but it may also be, e.g., an intermetallic compound or a simple or compound semiconductor. Preferably, the metallic member and the insulating member should have a similar thermal coefficient of expansion to reduce, among other things, the liability of separation on cooling or temperature cycling. The insulating member is then heated to a temperature sufficient to cause it to become slightly conductive. This temperature is below that at which the conductive member begins to oxidize at a rapid rate; that is, at a rate sufficient to build up an excessively thick oxide coating in the time required for bonding. An electrical potential is impressed across the members, a small but finite current thereby passing from one of the members to the other. In some cases, there is a preferred polarity of impressed voltage for stronger and faster bonding, but other materials show no preference, so that either polarity, or even AC, particularly a low frequency below about 50 cycles per second, may be used.

The voltage and current cause the members to be strongly attracted to each other, thus largely excluding atmospheric oxygen from the interface between their contacting surfaces. The voltage and current does not, however, effect a strong, permanent bond between the members at this temperature. Next, the insulating member is heated to a higher temperature while a voltage is maintained across the members. Although this higher temperature is below the fusion temperature of either member, and although no mechanical pressure is required, a strong and irreversible bond is formed between the contacting surfaces of the members in a matter of seconds or minutes, the exact time depending upon the materials and upon the bonding parameters employed. Most bonds can be formed in about 1 to 5 minutes but some bonds may require up to 20 minutes or even slightly longer.

More particularly, in this improvement, substantially smooth and complementary surfaces of the insulating member and the oxidizable metallic member are placed in contact with each other. The members are then heated to a temperature somewhat below that at which the conductive metallic member begins to oxidize rapidly, but at which the insulator becomes slightly electrically- conductive. The magnitude of this temperature of course may vary, depending upon the specific materials to be bonded, but will normally be below approximately 350° C. The decrease in resistivity of the insulator may be considered in conjunction with the corresponding increase in oxidation rate of the conductive material with increasing temperature. Even for a particular set of materials, there is usually no single optimum temperature; rather, it will normally be found that a range of temperature will meet the above criteria.

When the insulator has been heated to the above temperature, an electrical potential is impressed across the members. This results in the flow of a low-density current from one of the members to the other. The energy dissipated by this small current has no appreciable heat-producing effect upon the insulator. The potential may range from about 100 volts to about 5,000 volts or more, depending upon the type material used and its thickness. Although a strong, permanent bond is not formed between the materials at this state, the high voltage gradient existing at and across the interface between them is sufficient to cause an electrostatic attraction sufficient to force the members together. This attraction leads to an intimate contact at the interface, which largely excludes oxygen therefrom and thus prevents or minimizes oxide formation; it will be appreciated that the contacting surfaces, although initially substantially smooth, will nevertheless have points of actual contact separated by appreciable gaps capable of admitting ambient oxygen to the oxidizable member. As evidence that although no bond is formed an electrostatic attraction result is readily observed by the phenomenon of the disappearance of light interference fringes during the process. The present process therefore allows bonding to proceed in a normal room atmosphere, without any necessity for surrounding the oxidizable member with an inert or reducing atmosphere or with a vacuum.

The insulator is next heated to a higher temperature in order that bond formation may occur in accordance with the basic bonding process previously referred to. This temperature also depends upon the composition of the insulating material and upon the other bonding parameters employed; but it will most often be at least approximately 100° C. greater than the previously described temperature used in electrostatically attracting the members together. The applied potential is maintained across the members during heating to this temperature, in order to preserve the aforesaid intimate contact. Because of the decreasing resistivity of the insulator during the second heating step, however, it will usually be necessary to lower the applied voltage to prevent dielectric breakdown of the insulator.

An illustrative example of the concepts of the present process involves the bonding of a 0.5 mm. thick annular flange of "Niromet 44," an iron-based alloy containing nickel and cobalt, to a 4 cm. diameter, 5 mm. thick lens of fiber-optic material, which is an array of glass fibers embedded in a matrix of one or two other glasses. Complementary ground and polished surfaces of the two members are placed in contact with each other, and the members are heated to approximately 300° C. A DC voltage of 3000 volts is then applied across the members, resulting in a strong attraction and intimate contact therebetween. The metal may be made positive and the fiber-optic piece negative in this instance, so that a positive current flows from the metal to the insulator. The members are next heated to approximately 600° C. while the voltage is gradually reduced to 1500 volts in order to avoid large current pulses indicative of dielectric breakdown. The current density at the higher temperature is about 10 microamperes per square millimeter of the interface area. Voltage and temperature are held relatively constant for about 5 minutes, until a strong, permanent bond has formed over the entire contacting surfaces. Progress of the bond may be followed visually, by looking through the fiber-optic member, as it proceeds laterally at the interface. Under the above conditions, bond strengths in the range of 1000—2000 p.s.i. have been attained. The bonds are hermetic as tested by a helium leak detector, and no distortion of the fiber-optic lens has resulted. The entire process may be carried out in room atmosphere.

Another illustration is given in the bonding of a thin "-Kovar" cover sheet to a 2 mm. thick substrate of borosilicate glass, commercially available as 7052 glass. The adjoining surfaces are ground and preferably polished or lapped. The materials are heated to about 200° C. and the positive terminal of a DC source of 2000 volts is connected to the metal member, the negative terminal of the source being connected to the glass substrate by a probe contact resting on its upper surface. The materials are next heated to about 450° C. while the voltage is maintained, but while its magnitude is decreased gradually to the neighborhood of 1000 volts. Formation of the bond may require about 10 minutes in this instance. Again, this bonding operation may be performed under ambient atmospheric conditions without degrading the quality of the bond.

The bonding of other fiber-optic and glass materials to the same or other readily oxidizable metallic materials takes place under similar conditions. Since many other insulating materials, such as alumina and porcelain, to name but a few, also display a decrease in electrical resistivity with increasing temperature, the method of the present invention may be used with them as well. Optimum temperatures at which the current is applied, as well as current densities, are a matter of design choice for particular materials. Factors to be considered include the oxidation rate of the metal at various temperatures, the change in resistivity of the insulator with temperature, and the thickness and dielectric strength of the insulating member. Tradeoffs among these factors will result in different parameters for different insulating materials, and even for different applications of the same materials. The composition of the conductive metallic member apparently has little or no influence on the parameters necessary to effect a bond.

Having thus described our invention by way of illustration rather than by way of limitation.

We claim:

1. A method of bonding a readily oxidizable metallic member to an insulating member of normally high resistivity but being conductive at elevated temperatures, said method comprising the steps of: placing said members in surface contact; heating said insulating member to a first temperature sufficient to render it electrically conductive, but less than about 350° C. and applying an electrical potential across said members sufficient to establish an electrostatic attraction therebetween and to inhibit oxide formation on said metallic member at said contacting surfaces; and thereafter heating said insulating member to a temperature at least about 100° C. greater than said first temperature, but below its fusion point, while maintaining said potential below the dielectric breakdown point of said insulating member to thereby effect a bond between said contacting surfaces.

2. A method according to claim 1, wherein said metallic member is an iron-based metal alloy.

3. A method according to claim 2, wherein said metallic member contains nickel.

4. A method according to claim 3, wherein said insulating member is a glass.

5. A method according to claim 4, wherein said glass is selected from the group consisting of fiber-optic glasses, borosilicate glasses and quartz glasses.

6. A method according to claim 5, wherein said glass is a fiber-optic glass.

7. A method of bonding a readily oxidizable metallic member to an insulating member having increased electrical conductivity at elevated temperatures; said method comprising the steps of: placing complementary surfaces of said members in contact with each other; inhibiting oxide growth upon the contacting surface of said metallic member by heating said insulating member to a temperature sufficient to render said insulating member electrically conductive and subjecting said members to an electrical potential sufficient to establish an electrostatic attraction therebetween; and effecting a bond between said contacting surfaces by heating said insulating member to an increased temperature below its fusion point while maintaining said potential below the dielectric breakdown point of said insulating member.

8. A method according to claim 7, wherein said metallic member is an iron-based metal alloy.

9. A method according to claim 8, wherein said metallic member contains nickel.

10. A method according to claim 9, wherein said insulating member is a glass.

11. A method according to claim 10, wherein said glass is selected from the group consisting of fiber-optic glasses, borosilicate glasses and quartz glasses.

12. A method according to claim 11, wherein said glass is a fiber-optic glass.